March 3, 1970  W. G. VON MEYER  3,497,963
COMPASS
Filed May 15, 1967

INVENTOR
WALTER G. VON MEYER
BY
Barnes, Kisselle, Raisch & Choate
ATTORNEYS

United States Patent Office 3,497,963
Patented Mar. 3, 1970

3,497,963
COMPASS
Walter G. Von Meyer, 1504 Port Jefferson Road, Sidney, Ohio 45365
Filed May 15, 1967, Ser. No. 640,439
Int. Cl. G01c 17/08
U.S. Cl. 33—223                 4 Claims

ABSTRACT OF THE DISCLOSURE

A combination advertising device and compass, the direction indicator of the compass being a razor blade which is magnitized. The exterior of the compass is formed by a transparent plastic case indented at the bottom for receiving a pivot pin. A supporting cone is pressed through the center opening of the razor blade, the cone being adapted to be supported by the pivot pin. The compass unit can be used to demonstrate the surface tension of liquids in that the case can be partially filled with water and the razor blade caused to normally float on the surface of the water.

---

This invention relates to a compass and more particularly to a compass construction wherein a razor blade serves as the direction indicating means.

BACKGROUND OF THE INVENTION

The gist of the invention lies in the creation of an inexpensive device for advertising a razor blade, which device performs a novel function and at the same time continuously advertises the blade in its use. At the same time the blade in its use as a compass can also demonstrate to students the principle of surface tension, the average thin razor blade being adapted to normally float on the surface of water; if the blade should sink, a shaking of the compass or a rotating of the same about a vertical axis will bring the blade up to the top of the water. The compass is magnetized to provide the same with suitable poles to cause the blade to rotate in response to the earth's magnetic field.

SUMMARY

The advertising compass shown herein comprises a magnetized blade with a plastic cone attached to the center of the blade, the cone being supported by a pin set into part of the plastic case. The arrangement of the case, pivot pin and cone is such that the blade will always be in operating position when the case is positioned upright. A body of liquid, preferably water, can be maintained in the compass case so that the razor blade will normally float on the water to demonstrate the principle of surface tension.

DESCRIPTION

Figure 1:
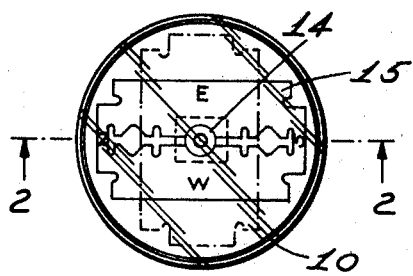
FIG. 1 is a plan view of a compass embodying the invention.

In all the figures the compass casing is shown as comprising two telescoping transparent halves 10 and 11. The overlapping edges of the two halves of the case may be a tight fit or adhered to each other. The material of the case may be of transparent organic plastic such as cellulose butyrate.

The base 11 of the case is preferably embossed as at 12 and carries a pivot pin 13. A plastic cone 14 is pressed into the center portion of a razor blade 15. The compass case may be filled with a body of liquid 16, preferably water, the amount being sufficient to space the inner apex of the cone 14 above the top of the pin 13. The razor blade 15 is magnetized and the corresponding poles marked. The thin razor blade will float on top of the water, and if for some reason because of carrying the compass in the pocket the blade should tilt or become immersed in the water, a shaking of the compass or twirling of the compass about its vertical axis will cause the blade to float on the water because of the surface tension of the water.

Figure 3:
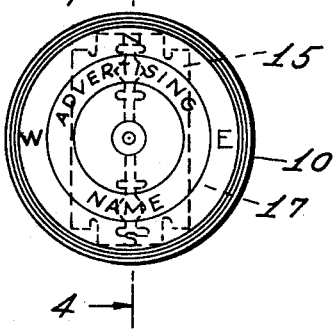
FIG. 3 is a plan view of a modification of the invention.
Figure 2:
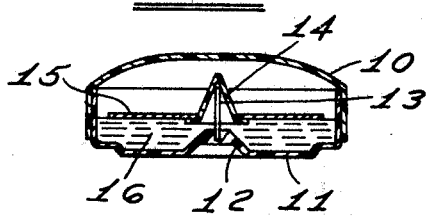
FIG. 2 is a sectional view taken along the line 2—2 of FIG. 1.
Figure 4:
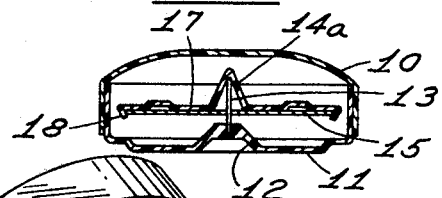
FIG. 4 is a sectional view taken along the line 4—4 of FIG. 3.

In the modification shown in FIGS. 3 and 4, no liquid is used and the top of the blade is covered with paper or a plastic member 17, the cone 14a forming a part thereof. In this modification the edges 18 of the member 17 are crimped around the ends of the blade and the blade and its member 17 are supported directly on the pin 13 through the medium of the cone 14a. In this modification the razor blade being advertised can be seen from the transparent bottom of the case 11 and the member 17 can carry additional advertising.

Figure 6:
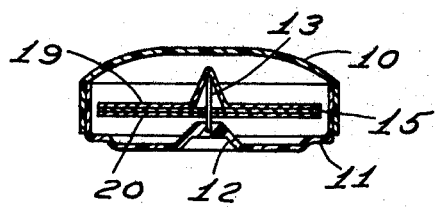
FIG. 6 is a sectional view of a modification wherein the razor blade is covered with paper on both sides.
Figure 5:
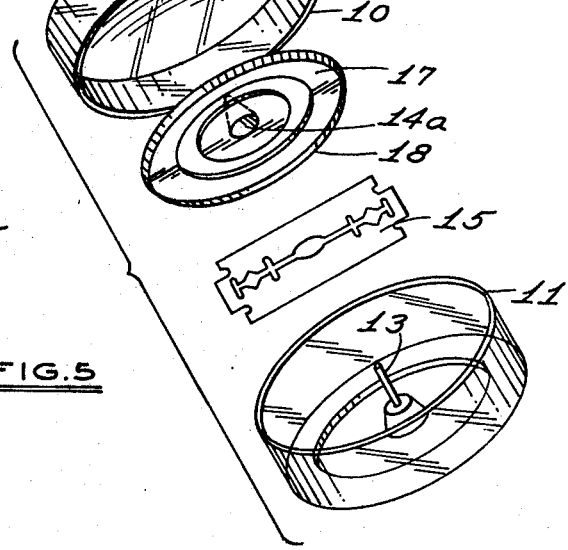
FIG. 5 is an exploded view of the compass shown in FIGS. 3 and 4.

In the modification shown in FIG. 6, the razor blade 15 is sandwiched between a top member 19 and a bottom member 20, which members may carry suitable advertising matter.

It will thus be seen that I have provided a very inexpensive compass unit which can be utilized in demonstrating surface tension, which utilizes a razor blade and which utilizes a member to be advertised, namely, a razor blade, as a direction indicator of the compass. Even if the liquid of the compass is lost for any reason, the razor blade will still act as a direction indicator and carry on the advertising message. It can also be seen that the compass unit is so inexpensive as to readily be classified as a "premium" article.

I claim:

1. The combination of a magnetic compass comprising a transparent plastic housing and a magnetized razor blade rotatably supported by and spaced from one wall of the housing.

2. The combination defined in claim 1 wherein said razor blade is provided with a supporting member at the center thereof, said supporting member being freely and rotatably mounted on a pin carried by a casing wall.

3. The combination defined in claim 2 wherein said casing is provided with a body of liquid on the top of which said razor blade is adapted to float, the amount of liquid being sufficient to position said supporting member above and out of contact with said pin when said blade is floating on the surface of the liquid.

4. The combination defined in claim 1 wherein said supporting member for the razor blade comprises a member enclosing at least a portion of the razor blade and including a cone member positioned at the center of the razor blade.

References Cited

UNITED STATES PATENTS

| | | |
|---|---|---|
| 1,610,477 | 12/1926 | Sanford. |
| 1,614,228 | 1/1927 | Breed. |
| 2,294,355 | 8/1942 | Hull. |
| 1,961,068 | 5/1934 | Mix _____ 33—222 |

FOREIGN PATENTS

| | | |
|---|---|---|
| 1,054,674 | 10/1953 | France. |
| 582,691 | 11/1946 | Great Britain. |
| 583,012 | 12/1946 | Great Britain. |
| 562,490 | 5/1957 | Italy. |
| 169,383 | 8/1934 | Switzerland. |

ROBERT B. HULL, Primary Examiner

U.S. Cl. X.R.

33—222